United States Patent
Kimura

(10) Patent No.: US 11,309,130 B2
(45) Date of Patent: Apr. 19, 2022

(54) MULTILAYER CERAMIC CAPACITOR

(71) Applicant: Murata Manufacturing Co., Ltd., Nagaokakyo (JP)

(72) Inventor: Hitoaki Kimura, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 135 days.

(21) Appl. No.: 16/822,064

(22) Filed: Mar. 18, 2020

(65) Prior Publication Data
US 2020/0312566 A1 Oct. 1, 2020

(30) Foreign Application Priority Data
Mar. 28, 2019 (JP) .............................. JP2019-064076

(51) Int. Cl.
*H01G 4/30* (2006.01)
*H01G 4/12* (2006.01)
*H01G 4/012* (2006.01)

(52) U.S. Cl.
CPC .............. *H01G 4/30* (2013.01); *H01G 4/012* (2013.01); *H01G 4/1209* (2013.01)

(58) Field of Classification Search
None
See application file for complete search history.

(56) References Cited

U.S. PATENT DOCUMENTS

| | | | | |
|---|---|---|---|---|
| 2015/0340155 A1* | 11/2015 | Fukunaga | ............. | H01G 4/012 361/301.4 |
| 2015/0340156 A1* | 11/2015 | Masunari | ............. | H01G 4/008 361/301.4 |
| 2017/0018363 A1* | 1/2017 | Tanaka | ............. | H01G 4/30 |
| 2017/0076870 A1 | 3/2017 | Noda et al. | | |
| 2019/0355519 A1* | 11/2019 | Taniguchi | ............. | H01G 4/12 |
| 2019/0371528 A1* | 12/2019 | Takashima | ............. | H01G 4/012 |
| 2020/0066446 A1* | 2/2020 | Fukunaga | ............. | H01G 4/2325 |

(Continued)

FOREIGN PATENT DOCUMENTS

JP 2017-059633 A 3/2017

OTHER PUBLICATIONS

Yokomizo et al., "Multilayer Ceramic Capacitor", U.S. Appl. No. 16/822,065, filed Mar. 18, 2020.

(Continued)

*Primary Examiner* — Dion R. Ferguson
(74) *Attorney, Agent, or Firm* — Keating & Bennett, LLP

(57) ABSTRACT

A multilayer ceramic capacitor includes a laminate and an external electrode, the laminate includes a central layer portion in which first and second internal electrode layers are alternately laminated with a dielectric ceramic layer therebetween, a peripheral layer portion sandwiching the central layer portion in a lamination direction and made of a ceramic material, and a side margin sandwiching the central layer portion and the peripheral layer portion in a width direction and made of a ceramic material, the side margin includes an inner layer on an innermost side in the width direction and an outer layer on an outermost side in the width direction, and an element of an additive of the ceramic material included in the peripheral layer portion is the same as an element of an additive of a ceramic material included in the inner layer.

17 Claims, 6 Drawing Sheets

(56) References Cited

U.S. PATENT DOCUMENTS

2020/0126721 A1* 4/2020 Fukunaga ............ H01G 4/1209
2020/0312566 A1* 10/2020 Kimura ................. H01G 4/012

OTHER PUBLICATIONS

Sakai, "Multilayer Ceramic Capacitor", U.S. Appl. No. 16/822,067, filed Mar. 18, 2020.
Doi et al., "Multilayer Ceramic Capacitor", U.S. Appl. No. 16/822,068, filed Mar. 18, 2020.
Harada et al., "Multilayer Ceramic Capacitor", U.S. Appl. No. 16/822,069, filed Mar. 18, 2020.
Uchida, "Multilayer Ceramic Capacitor", U.S. Appl. No. 16/822,070, filed Mar. 18, 2020.

* cited by examiner

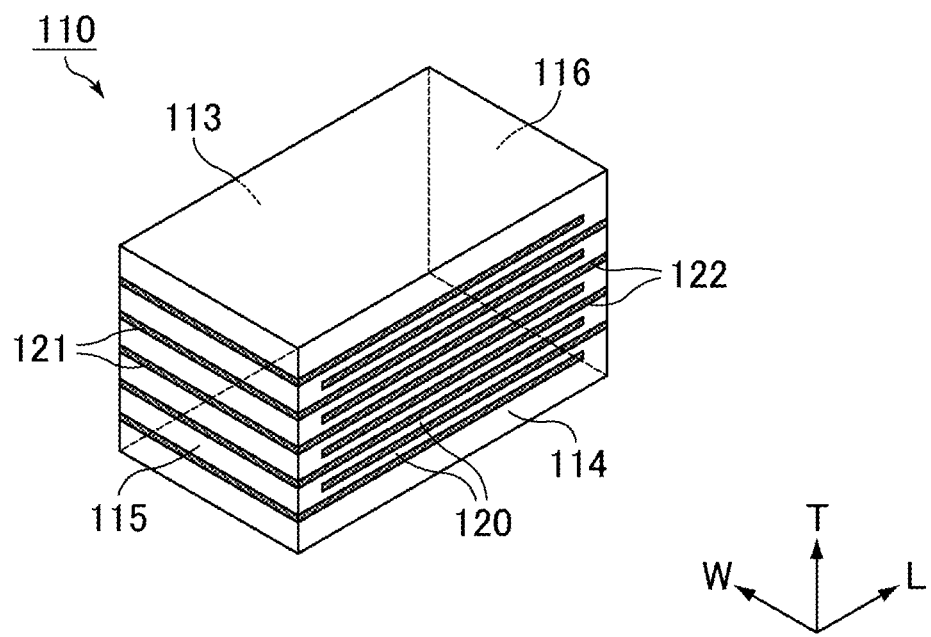

MULTILAYER CERAMIC CAPACITOR

CROSS REFERENCE TO RELATED APPLICATIONS

This application claims the benefit of priority to Japanese Patent Application No. 2019-064076 filed on Mar. 28, 2019. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor includes, for example, a laminate in which dielectric ceramic layers and internal electrode layers are alternately laminated and dielectric ceramic layers are further laminated on the top and bottom surfaces thereof, and external electrodes formed on both end surfaces of the laminate. In the multilayer ceramic capacitor as described above, a ceramic layer called a side margin may be disposed on a lateral surface of the laminate in order to prevent internal electrodes from being connected to the external electrodes on the lateral surface of the laminate.

For example, JP 2017-59633 A discloses a multilayer electronic component in which an insulating layer is provided on each of a pair of lateral surfaces of an element body in which dielectric layers and internal electrode layers are alternately laminated.

In recent years, multilayer ceramic capacitors have been required to be reduced in size and increased in capacitance. In order to realize such a multilayer ceramic capacitor, as described in JP 2017-59633 A, it is considered that an effective area where internal electrode layers oppose each other is expanded by thinning an insulating layer corresponding to a side margin. On the other hand, from the viewpoint of enhancing mechanical strength, the side margin may contain a component different from that of the dielectric ceramic layers defining the laminate. However, in such a case, the adhesive strength of the side margin to the dielectric ceramic layers is insufficient, so that the side margin may be peeled off.

SUMMARY OF THE INVENTION

Preferred embodiments of the present invention provide multilayer ceramic capacitors in which peeling of a side margin is reduced or prevented.

A multilayer ceramic capacitor according to a preferred embodiment of the present invention includes a laminate including a dielectric ceramic layer and an internal electrode layer that are laminated in a lamination direction; and an external electrode connected to the internal electrode layer, wherein the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction, the internal electrode layer includes a first internal electrode layer extending to the first end surface and a second internal electrode layer extending to the second end surface so as to oppose the first internal electrode layer with the dielectric ceramic layer therebetween, the external electrode includes a first external electrode disposed on the first end surface and connected to the first internal electrode layer, and a second external electrode disposed on the second end surface and connected to the second internal electrode layer, the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material, the side margin includes an inner layer on an innermost side in the width direction and an outer layer on an outermost side in the width direction, and an element of an additive of the ceramic material included in the peripheral layer portion is the same as an element of an additive of a ceramic material included in the inner layer.

A multilayer ceramic capacitor according to a preferred embodiment of the present invention includes a laminate including a dielectric ceramic layer and an internal electrode layer that are laminated in a lamination direction; and an external electrode connected to the internal electrode layer, wherein the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction, the internal electrode layer includes a first internal electrode layer extending to the first end surface and a second internal electrode layer extending to the second end surface so as to oppose the first internal electrode layer with the dielectric ceramic layer therebetween, the external electrode includes a first external electrode disposed on the first end surface and connected to the first internal electrode layer, and a second external electrode disposed on the second end surface and connected to the second internal electrode layer, the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material, the side margin includes an inner layer on an innermost side in the width direction and an outer layer on an outermost side in the width direction, and a content of Si in the peripheral layer portion is equal or substantially equal to a content of Si in the inner layer.

According to preferred embodiments of the present invention, multilayer ceramic capacitors in which peeling of a side margin is reduced or prevented can be provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a schematic perspective view showing an example of a green chip.

DETAILED DESCRIPTION OF THE PREFERRED EMBODIMENTS

Hereinafter, multilayer ceramic capacitors according to preferred embodiments of the present invention will be described in detail with reference to the drawings. Note that the present invention is not limited to the following configurations, and may be appropriately changed without departing from the scope of the present invention. Furthermore, the present invention also includes a combination of multiple individual preferred embodiments described below.

Each preferred embodiment described below is an exemplification, and the configurations shown in different preferred embodiments can be partially replaced or combined with one another. In a second and subsequent preferred embodiments, description of matters common to a first preferred embodiment will be omitted, and differences therebetween will be mainly described. In particular, similar advantageous operations and effects by similar configurations will not be described one by one in each preferred embodiment.

First Preferred Embodiment

A multilayer ceramic capacitor according to a first preferred embodiment of the present invention will be described below.

Multilayer Ceramic Capacitor

Figure 1:
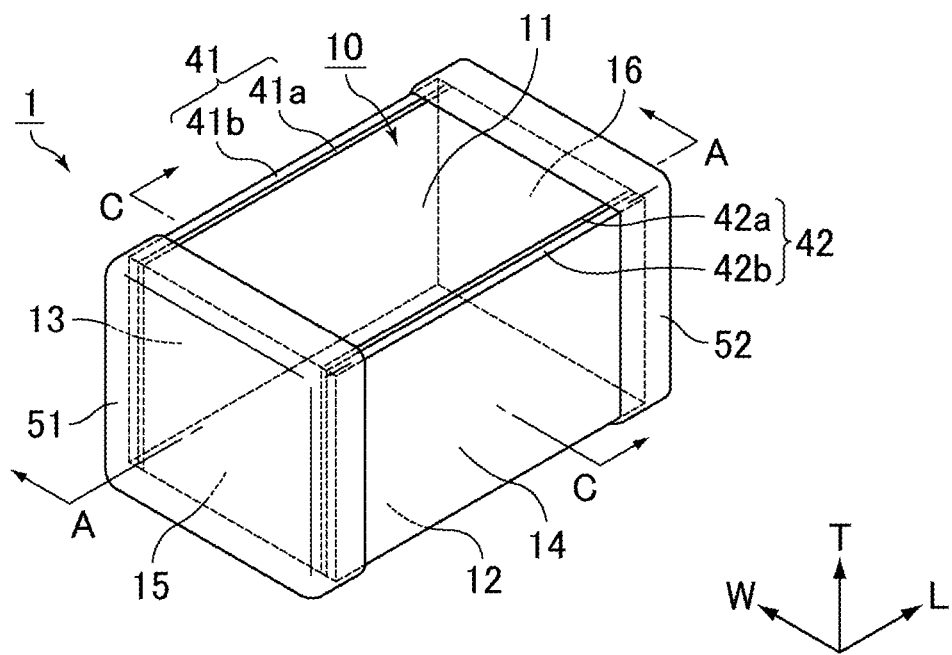
FIG. 1 is a schematic perspective view showing an example of a multilayer ceramic capacitor according to a first preferred embodiment of the present invention.
Figure 2:
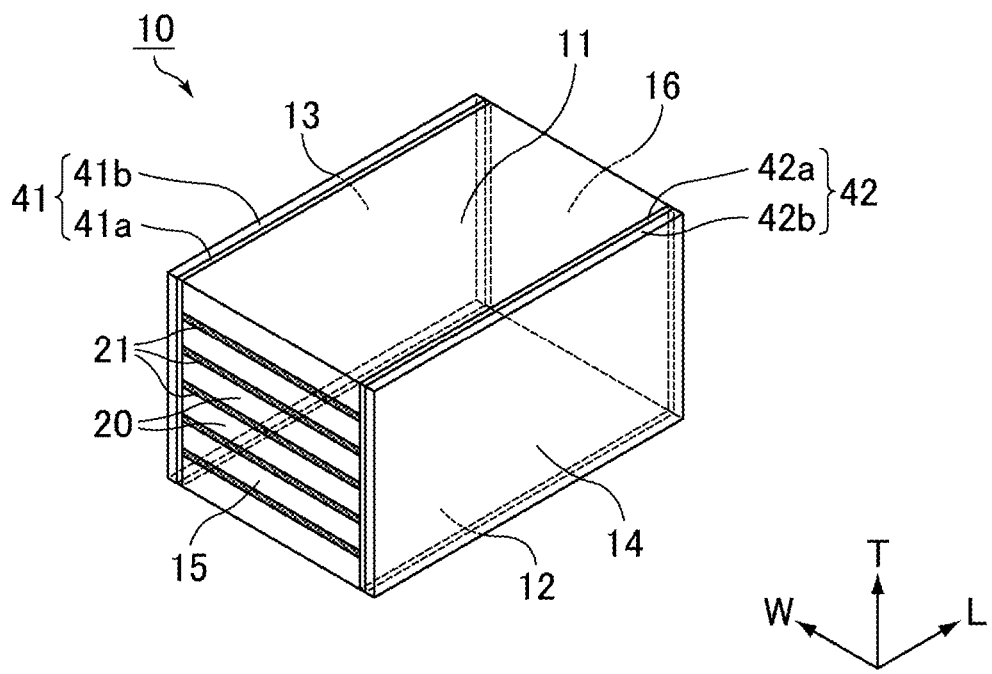
FIG. 2 is a schematic perspective view showing an example of a laminate defining the multilayer ceramic capacitor in FIG. 1.
Figure 3:
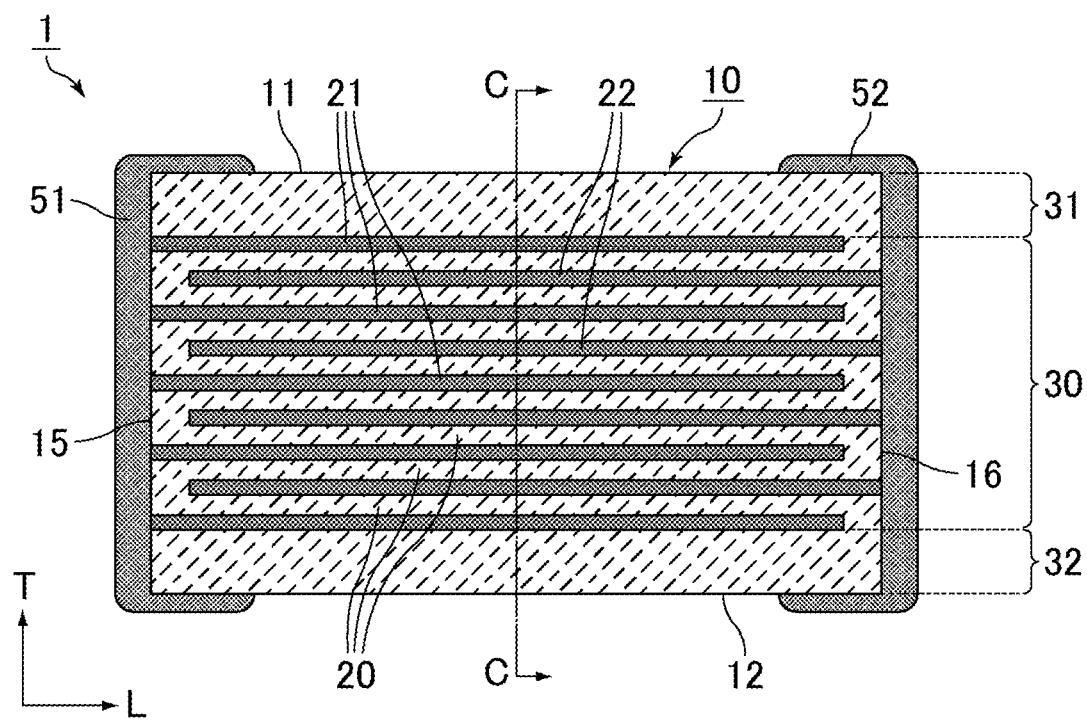
FIG. 3 is a schematic cross-sectional view showing a portion corresponding to a line segment A-A in FIG. 1.
Figure 4:
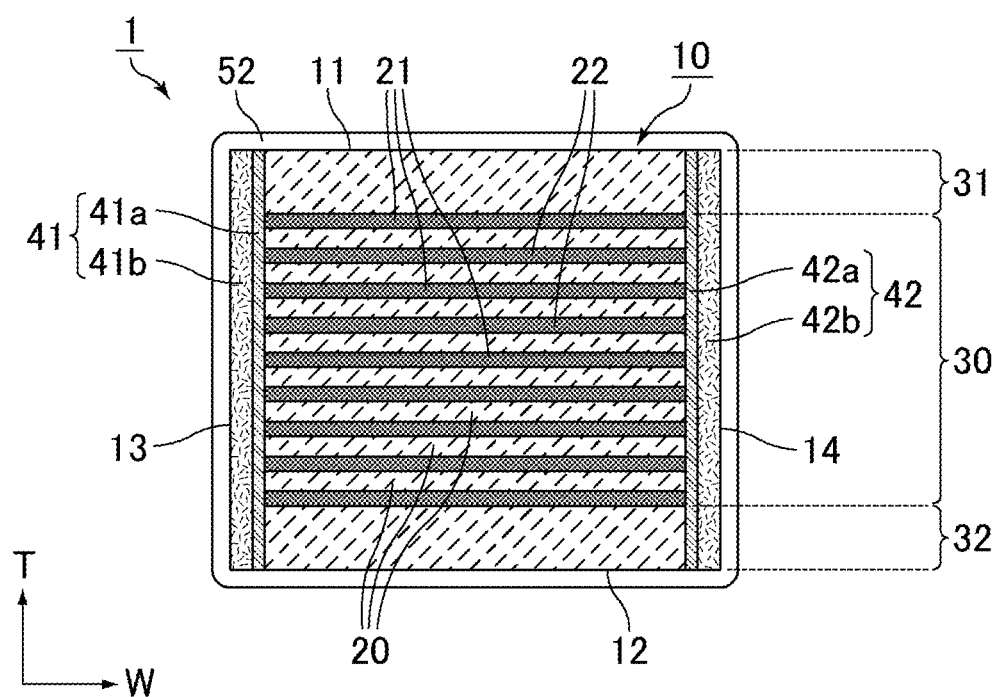
FIG. 4 is a schematic cross-sectional view showing a portion corresponding to a line segment C-C in FIG. 1.

FIG. 1 is a schematic perspective view showing an example of a multilayer ceramic capacitor according to the first preferred embodiment of the present invention. FIG. 2 is a schematic perspective view showing an example of a laminate defining the multilayer ceramic capacitor in FIG. 1. FIG. 3 is a schematic cross-sectional view showing a portion corresponding to a line segment A-A in FIG. 1. FIG. 4 is a schematic cross-sectional view showing a portion corresponding to a line segment C-C in FIG. 1.

Herein, "lamination direction", "width direction", and "length direction" of the multilayer ceramic capacitor and the laminate are set as directions defined by arrows T, W, and L respectively as indicated in the multilayer ceramic capacitor 1 in FIG. 1 and the laminate 10 in FIG. 2. Here, the lamination (T) direction, the width (W) direction, and the length (L) direction are perpendicular or substantially perpendicular to one another.

As shown in FIG. 1, the multilayer ceramic capacitor includes a laminate 10, and first and second external electrodes 51 and 52 respectively disposed on both end surfaces of the laminate 10.

As shown in FIG. 2, the laminate 10 has a rectangular parallelepiped shape or a substantially rectangular parallelepiped shape, and includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 that oppose each other in the length (L) direction perpendicular or substantially perpendicular to the lamination (T) direction and the width (W) direction.

Herein, a cross-section of the multilayer ceramic capacitor 1 or the laminate 10 that is perpendicular or substantially perpendicular to the first end surface 15 and the second end surface 16 and parallel or substantially parallel to the lamination (T) direction is referred to as an LT cross-section which is a cross-section in the length (L) direction and the lamination (T) direction. Further, a cross-section of the multilayer ceramic capacitor 1 or the laminate 10 that is perpendicular or substantially perpendicular to the first lateral surface 13 and the second lateral surface 14 and parallel or substantially parallel to the lamination (T) direction is referred to as a WT cross-section which is a cross-section in the width (W) direction and the lamination (T) direction. Still further, a cross-section of the multilayer ceramic capacitor 1 or the laminate 10 that is perpendicular or substantially perpendicular to the first lateral surface 13, the second lateral surface 14, the first end surface 15, and the second end surface 16 and perpendicular or substantially perpendicular to the lamination (T) direction is referred to as an LW cross-section which is a cross-section in the length (L) direction and the width (W) direction. Accordingly, FIG. 3 shows the LT cross-section of the multilayer ceramic capacitor 1, and FIG. 4 shows the WT cross-section of the multilayer ceramic capacitor 1.

In the laminate 10, corners and edges are preferably rounded. The corner of the laminate 10 is a portion where three surfaces of the laminate 10 meet, and the edge of the laminate 10 is a portion where two surfaces of the laminate 10 meet.

As shown in FIG. 2, FIG. 3, and FIG. 4, the laminate includes multiple dielectric ceramic layers 20, multiple first internal electrode layers 21, and multiple second internal electrode layers 22 that are laminated in the lamination (T) direction.

The dielectric ceramic layers 20 extend along the width (W) direction and the length (L) direction.

Each of the first internal electrode layers 21 and the second internal electrode layers 22 is disposed along the interface between the dielectric ceramic layers 20. Each of the first internal electrode layers 21 and the second internal electrode layers 22 extends in a tabular shape along the dielectric ceramic layers 20.

The first internal electrode layers 21 extend to the first end surface 15 of the laminate 10. The second internal electrode layers 22 extend to the second end surface 16 of the laminate 10 so as to oppose the first internal electrode layers 21 with the dielectric ceramic layers 20 therebetween. More specifically, the first internal electrode layer 21 and the second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

Each of the first internal electrode layer 21 and the second internal electrode layer 22 preferably include metal such as, for example, Ni, Cu, Ag, Pd, Au, or Ag—Pd alloy. Each of the first internal electrode layer 21 and the second internal electrode layer 22 may include the same dielectric ceramic material as the dielectric ceramic layer 20, in addition to the metal described above.

The first external electrode 51 is disposed on the first end surface 15 of the laminate 10. In FIG. 1, the first external electrode 51 includes a portion extending onto a portion of each of the first main surface 11, the second main surface 12, the first lateral surface 13, and the second lateral surface 14. The first external electrode 51 is connected to the first internal electrode layers 21 on the first end surface 15.

The second external electrode 52 is disposed on the second end surface 16 of the laminate 10. In FIG. 1, the second external electrode 52 includes a portion extending onto a portion of each of the first main surface 11, the second main surface 12, the first lateral surface 13, and the second lateral surface 14. The second external electrode 52 is connected to the second internal electrode layers 22 on the second end surface 16.

Each of the first external electrode 51 and the second external electrode 52 preferably includes, for example, a Ni layer including Ni and a ceramic material. The Ni layer is a base electrode layer. Such a Ni layer can be formed by a co-fire method by which the Ni layer is sintered simultaneously with the laminate 10 (the first internal electrode layers 21 and the second internal electrode layers 22). The Ni layer is preferably in direct contact with the laminate 10.

The types of elements included in the first external electrode 51 and the second external electrode 52 can be checked by performing elemental analysis using transmission electron microscope-energy dispersive X-ray spectroscopy (TEM-EDX).

The ceramic material is preferably present in the Ni layer in an amount of about 25 area % or more and about 40 area % or less, for example. When the amount of the ceramic material in the Ni layer is about 25 area % or more, the Ni layer can be easily formed by the co-fire method. Further, the amount of the ceramic material in the Ni layer is more preferably about 35 area % or less, for example.

The amount of the ceramic material in the Ni layer is measured as follows. First, an LT cross-section at a central portion in the width (W) direction of the multilayer ceramic capacitor 1 is exposed by polishing or the like. Thereafter, by using a scanning electron microscope (SEM), a central portion in the length (L) direction of the Ni layer which is located at a central portion in the lamination (T) direction is magnified by 10,000 times. The field of view of the magnified region is set to about 6 μm×about 8 μm. Thereafter, the magnified region is subjected to element mapping by wavelength dispersive X-ray spectroscopy (WDX), and the area ratio of the ceramic material is measured from an image obtained by the element mapping.

The first external electrode 51 preferably includes a Ni layer, a first plating layer, and a second plating layer in order from the first end surface 15 side of the laminate 10. The second external electrode 52 preferably includes a Ni layer, a first plating layer, and a second plating layer in order from the second end surface 16 side of the laminate 10. The first plating layer is preferably formed by Ni plating, for example. The second plating layer is preferably formed by Sn plating, for example. Each of the first external electrode 51 and the second external electrode 52 may include a conductive resin layer including conductive particles and resin between the Ni layer and the first plating layer. For example, metal particles of Cu, Ag, Ni or the like may be used as the conductive particles in the conductive resin layer.

Note that the Ni layer may be formed by a post-fire method by which a conductive paste is applied and baked after the laminate 10 (the first internal electrode layers 21 and the second internal electrode layers 22) is sintered. In this case, the Ni layer may not include any ceramic material.

It is preferable that the element of the ceramic material included in the Ni layer and the element of a ceramic material included in an outer layer described later are the same as each other. As a result, when the conductive paste for the external electrode is applied to a raw laminate and sintered together, the sintering behaviors of the outer layer and the Ni layer become closer, and as a result, the adhesive strength between the outer layer and the Ni layer increases.

Each of the first external electrode 51 and the second external electrode 52 may include a base electrode layer including metal such as Cu, for example. The base electrode layer may be formed by the co-fire method or may be formed by the post-fire method. Further, the base electrode layer may have a multilayer structure.

For example, the first external electrode 51 may include a Cu layer defining and functioning as a base electrode layer, a conductive resin layer including conductive particles and resin, a first plating layer, and a second plating layer in order from the first end surface 15 side of the laminate 10. The second external electrode 52 may include a Cu layer defining and functioning as a base electrode layer, a conductive resin layer including conductive particles and resin, a first plating layer, and a second plating layer in order from the second end surface 16 side of the laminate 10. Metal particles of Cu, Ag, Ni or the like, for example, may be used as the conductive particles in the conductive resin layer.

As shown in FIG. 3 and FIG. 4, the laminate 10 includes a central layer portion 30, a peripheral layer portion 31, a peripheral layer portion 32, a side margin 41, and a side margin 42.

In the central layer portion 30, the first internal electrode layers 21 and the second internal electrode layers 22 are alternately laminated with the dielectric ceramic layers 20 therebetween. In FIG. 3 and FIG. 4, the central layer portion 30 includes a region sandwiched by a first internal electrode layer 21 closest to the first main surface 11 and a first internal electrode layer 21 closest to the second main surface 12 along the lamination (T) direction.

The dielectric ceramic layers 20 defining the central layer portion 30 include, for example, a dielectric ceramic material including, as a main component, a perovskite compound including Ba and Ti. $BaTiO_3$ and the like are used as such a perovskite compound. The dielectric ceramic material included in the dielectric ceramic layers 20 defining the central layer portion 30 may include, for example, at least one additive selected from the group consisting of Si, Mg, Mn, Al, Zr, Ho, and Zn.

The peripheral layer portion 31 and the peripheral layer portion 32 sandwich the central layer portion 30 in the lamination (T) direction. The peripheral layer portion 31 is disposed on the first main surface 11 side of the laminate 10. The peripheral layer portion 32 is disposed on the second main surface 12 side of the laminate 10.

Each of the peripheral layer portion 31 and the peripheral layer portion 32 is made of a ceramic material. The ceramic material included in the peripheral layer portion 31 and the peripheral layer portion 32 includes an additive in addition to the main component.

For example, a dielectric ceramic material is used as the ceramic material included in the peripheral layer portion 31 and the peripheral layer portion 32. The dielectric ceramic material included in the peripheral layer portion 31 and the peripheral layer portion 32 preferably includes, for example, a perovskite compound including Ba and Ti (for example, $BaTiO_3$) as a main component, and also includes, for example, at least one element selected from the group consisting of Si, Mg, Mn, Al, Zr, Ho, and Zn as an additive.

Herein, "the main component of the ceramic material" means a component having the largest content in the ceramic material. "The additive of the ceramic material" means a component whose content in the ceramic material is about 5 mol or less with respect to 100 mol of Ti as the main component. The content of the main component in the ceramic material and the content of the additive in the ceramic material can be checked by performing quantitative analysis using inductively coupled plasma (ICP) emission spectroscopy.

Each of the peripheral layer portion 31 and the peripheral layer portion 32 may have a multilayer structure including multiple dielectric ceramic layers 20 laminated in the lamination (T) direction, or may have a single layer structure including a single dielectric ceramic layer 20.

When the peripheral layer portion 31 and the peripheral layer portion 32 are made of the dielectric ceramic layers 20, the dielectric ceramic layers 20 defining the peripheral layer portion 31 and the peripheral layer portion 32 may include the same dielectric ceramic material as the dielectric ceramic layers 20 defining the central layer portion 30, or include a dielectric ceramic material different from that of the dielectric ceramic layers 20 defining the central layer portion 30.

The side margin 41 and the side margin 42 sandwich the central layer portion 30, the peripheral layer portion 31, and the peripheral layer portion 32 in the width (W) direction. The side margin 41 is disposed on the first lateral surface 13 side of the laminate 10. The side margin 42 is disposed on the second lateral surface 14 side of the laminate 10.

Each of the side margin 41 and the side margin 42 is made of a ceramic material. The ceramic material included in the side margin 41 and the side margin 42 preferably includes an additive in addition to the main component.

The side margin 41 includes multiple ceramic layers laminated in the width (W) direction. In FIG. 4, the side margin 41 has a two-layer structure including an inner layer 41a on an innermost side in the width (W) direction and an outer layer 41b on an outermost side in the width (W) direction. Each of the inner layer 41a and the outer layer 41b is a ceramic layer made of a ceramic material. The side margin 41 may have a structure including three or more layers, instead of the two-layer structure described above. When the side margin 41 includes three or more ceramic layers, a ceramic layer on the innermost side in the width (W) direction is set as the inner layer, and the other ceramic layers including a ceramic layer on the outermost side in the width (W) direction are set as the outer layer.

When the side margin 41 has the above-described two-layer structure, it can be confirmed that the side margin 41 has the two-layer structure from the difference in sinterability between the inner layer 41a and the outer layer 41b by observation using an optical microscope in a dark field. The same applies to a case where the side margin 41 has a structure including three or more layers.

The side margin 42 includes multiple ceramic layers laminated in the width (W) direction. In FIG. 4, the side margin 42 has a two-layer structure including an inner layer 42a on an innermost side in the width (W) direction and an outer layer 42b on an outermost side in the width (W) direction. Each of the inner layer 42a and the outer layer 42b is a ceramic layer made of a ceramic material. The side margin 42 may have a structure including three or more layers, instead of the two-layer structure described above. When the side margin 42 has three or more ceramic layers, a ceramic layer on the innermost side in the width (W) direction is set as the inner layer, and the other ceramic layers including a ceramic layer on the outermost side in the width (W) direction are set as the outer layer.

When the side margin 42 has the above-described two-layer structure, it can be checked that the side margin 42 has the two-layer structure from the difference in sinterability between the inner layer 42a and the outer layer 42b by observation using an optical microscope in a dark field. The same applies to a case where the side margin 42 has a structure including three or more layers.

The numbers of ceramic layers defining the side margin 41 and the side margin 42 may be equal to each other or different from each other.

For example, a dielectric ceramic material is used as the ceramic material included in the inner layer 41a and the inner layer 42a. The dielectric ceramic material included in the inner layer 41a and the inner layer 42a preferably includes, for example, a perovskite compound including Ba and Ti (for example, $BaTiO_3$) as a main component, and also includes at least one element selected from the group consisting of, for example, Si, Mg, Mn, Al, Zr, Ho, and Zn as an additive. The inner layer 41a defines and functions as a layer joining the outer layer 41b to the central layer portion 30, the peripheral layer portion 31, and the peripheral layer portion 32. The inner layer 42a defines and functions as a layer joining the outer layer 42b to the central layer portion 30, the peripheral layer portion 31, and the peripheral layer portion 32.

For example, a dielectric ceramic material is used as the ceramic material included in the outer layer 41b and the outer layer 42b. The dielectric ceramic material included in the outer layer 41b and the outer layer 42b preferably includes, for example, a perovskite compound including Ba and Ti (for example, $BaTiO_3$) as a main component, and also includes at least one element selected from the group consisting of, for example, Si, Mg, Mn, Al, Zr, Ho, and Zn as an additive. The outer layer 41b functions as a layer providing mechanical strength to the side margin 41. The outer layer 42b defines and functions as a layer providing mechanical strength to the side margin 42.

In the multilayer ceramic capacitor 1, the element of the additive of the ceramic material included in one or both of the peripheral layer portion 31 and the peripheral layer portion 32 is the same as the element of the additive of the ceramic material included in one or both of the inner layer 41a and the inner layer 42a. As a result, the adhesive strength between the peripheral layer portion and the inner layer including the same element of the additive is increased, and as a result, the peeling of the side margin including the inner layer is reduced or prevented.

Herein, "the elements of the additives of the ceramic materials are the same as each other" means that the types of the elements of the additives of the ceramic materials are the same as each other, and the contents thereof are not limited. For example, in comparison of two layers, when the element of the additive of the ceramic material included in one layer is S1 and S2 while the element of the additive of the ceramic material included in the other layer is S1 and S2, it is considered that the elements of the additives of the ceramic materials included in both of the layers are the same as each other. The same applies to a case where three or more layers are compared.

"The element of the additive of the ceramic material included in one or both of the peripheral layer portion 31 and the peripheral layer portion 32 is the same as the element of the additive of the ceramic material included in one or both of the inner layer 41a and the inner layer 42a" includes, for example, the following (Example 1A), (Example 2A), and (Example 3A), and preferably includes (Example 3A).

Example 1A

The element of the additive of the ceramic material included in one or both of the peripheral layer portion 31 and the peripheral layer portion 32 is the same as the element of the additive of the ceramic material included in the inner layer 41a. As a result, peeling of the side margin 41 is reduced or prevented.

Example 2A

The element of the additive of the ceramic material included in one or both of the peripheral layer portion 31 and the peripheral layer portion 32 is the same as the element of the additive of the ceramic material included in the inner layer 42a. As a result, peeling of the side margin 42 is reduced or prevented.

Example 3A

The element of the additive of the ceramic material included in the peripheral layer portion 31 and the peripheral layer portion 32 is the same as the element of the additive of the ceramic material included in the inner layer 41a and the inner layer 42a. As a result, peeling of both the side margin 41 and the side margin 42 is reduced or prevented.

Focusing on the additive of the ceramic material included in the inner layer 41a and the inner layer 42a and the additive of the ceramic material included in the outer layer 41b and the outer layer 42b, the following are preferable examples of the relationship therebetween.

When the element of the additive of the ceramic material included in one or both of the peripheral layer portion 31 and the peripheral layer portion 32 is the same as the element of the additive of the ceramic material included in the inner layer 41a, it is preferable that the element of the additive of the ceramic material in the inner layer 41a is different from the element of the additive of the ceramic material included in the outer layer 41b. As a result, it is possible to improve the mechanical strength (improve the reliability) of the side margin 41 by the outer layer 41b while reducing or preventing the peeling of the side margin 41.

When the element of the additive of the ceramic material included in one or both of the peripheral layer portion 31 and the peripheral layer portion 32 is the same as the element of the additive of the ceramic material included in the inner layer 42a, it is preferable that the element of the additive of the ceramic material included in the inner layer 42a is different from the element of the additive of the ceramic material included in the outer layer 42b. As a result, it is possible to improve the mechanical strength (improve reliability) of the side margin 42 by the outer layer 42b while reducing or preventing peeling of the side margin 42.

When the element of the additive of the ceramic material included in the peripheral layer portion 31 and the peripheral layer portion 32 is the same as the element of the additive of the ceramic material included in the inner layer 41a and the inner layer 42a, it is preferable that the element of the additive of the ceramic material included in the inner layer 41a and the inner layer 42a is different from the element of the additive of the ceramic material included in the outer layer 41b and the outer layer 42b. As a result, it is possible to improve the mechanical strength (improve reliability) of the side margin 41 and the side margin 42 by the outer layer 41b and the outer layer 42b while reducing or preventing peeling of the side margin 41 and the side margin 42.

Herein, "the elements of the additives of the ceramic materials are different from each other" means that the types of the elements of the additives of the ceramic materials are different from each other, and the contents thereof are not limited. For example, when comparing two layers, a case where the element of the additive of the ceramic material included in one layer is S1 and S2 while the element of the additive of the ceramic material included in the other layer is only S1, S1 and S3, or S1, S2 and S3 indicates that the elements of the additives of the ceramic materials included in both layers are different from each other. The same applies to a case where three or more layers are compared.

Focusing on the main component of the ceramic material included in the peripheral layer portion 31 and the peripheral layer portion 32 and the main component of the ceramic material included in the inner layer 41a and the inner layer 42a, the following are preferable examples of the relationships therebetween.

When the element of the additive of the ceramic material included in one or both of the peripheral layer portion 31 and the peripheral layer portion 32 is the same as the element of the additive of the ceramic material included in the inner layer 41a, it is preferable that the elements of the main components thereof are also the same as each other. As a result, peeling of the side margin 41 is further reduced or prevented.

When the element of the additive of the ceramic material included in one or both of the peripheral layer portion 31 and the peripheral layer portion 32 is the same as the element of the additive of the ceramic material included in the inner layer 42a, it is preferable that the elements of the main components thereof are also the same as each other. As a result, peeling of the side margin 42 is further reduced or prevented.

When the element of the additive of the ceramic material included in the peripheral layer portion 31 and the peripheral layer portion 32 is the same as the element of the additive of the ceramic material included in the inner layer 41a and the inner layer 42a, it is preferable that the elements of the main components thereof are the same as each other. As a result, peeling of both the side margin 41 and the side margin 42 is further reduced or prevented.

Herein, "the elements of the main components of the ceramic materials are the same as each other" means that the types of the elements of the main components of the ceramic materials are the same as each other, and the contents thereof are not limited. For example, when comparing two layers, a case where the element of the main component of the ceramic material included in one layer is M1, M2, and M3 while the element of the main component of the ceramic material included in the other layer is M1, M2, and M3 indicates that the elements of the main components of the ceramic materials included in both layers are the same as each other. The same applies to a case where three or more layers are compared.

Focusing on the main component of the ceramic material included in the central layer portion 30 and the main component of the ceramic material included in the inner layer 41a and the inner layer 42a, the following are preferable examples of the relationships therebetween.

When the element of the additive of the ceramic material included in one or both of the peripheral layer portion 31 and the peripheral layer portion 32 is the same as the element of the additive of the ceramic material included in the inner layer 41a, it is preferable that the element of the main component of the ceramic material included in the central layer portion 30 (that is, the dielectric ceramic material included in the dielectric ceramic layer 20) is the same as the element of the main component of the ceramic material included in the inner layer 41a. As a result, the adhesive strength between the central layer portion 30 and the inner layer 41a is increased, and as a result, peeling of the side margin 41 is further reduced or prevented.

When the element of the additive of the ceramic material included in one or both of the peripheral layer portion 31 and the peripheral layer portion 32 is the same as the element of the additive of the ceramic material included in the inner layer 42a, it is preferable that the element of the main component of the ceramic material included in the central layer portion 30 (that is, the dielectric ceramic material included in the dielectric ceramic layer 20) is the same as the element of the main component of the ceramic material included in the inner layer 42a. As a result, the adhesive strength between the central layer portion 30 and the inner layer 42a is increased, and as a result, peeling of the side margin 42 is further reduced or prevented.

When the element of the additive of the ceramic material included in the peripheral layer portion 31 and the peripheral layer portion 32 is the same as the element of the additive of the ceramic material included in the inner layer 41a and the inner layer 42a, it is preferable that the element of the main component of the ceramic material included in the central layer portion 30 (that is, the dielectric ceramic material included in the dielectric ceramic layer 20) is the same as the element of the main component of the ceramic material included in the inner layer 41a and the inner layer 42a. As a result, the adhesive strength between the central layer portion 30 and each of the inner layer 41a and the inner layer 42a is increased, and as a result, peeling of the side margin 41 and the side margin 42 is further reduced or prevented.

Regarding the types of the elements of the main components of the ceramic materials and the types of the elements of the additives of the ceramic materials in the respective layers and the respective portions, they are checked by exposing a WT cross-section at the central portion in the length (L) direction of the multilayer ceramic capacitor 1 by polishing or the like and then performing element analysis using transmission electron microscope-energy dispersive X-ray spectroscopy (TEM-EDX).

Preferable thicknesses of the respective layers and the respective portions in the multilayer ceramic capacitor 1 will be described below.

The thickness (the thickness in the lamination (T) direction) of the dielectric ceramic layer 20 is preferably about 0.55 µm or less, for example. The thickness of the dielectric ceramic layer 20 is preferably about 0.4 µm or more, for example. Here, the thickness of the dielectric ceramic layer 20 specifically means the thickness of the dielectric ceramic layer 20 defining the central layer portion 30.

The thickness (thickness in the lamination (T) direction) of each of the first internal electrode layer 21 and the second internal electrode layer 22 is preferably about 0.4 µm or less, and more preferably about 0.38 µm or less, for example. Furthermore, the thickness of each of the first internal electrode layer 21 and the second internal electrode layer 22 is preferably about 0.25 µm or more, for example.

The thicknesses of the dielectric ceramic layer 20, the first internal electrode layer 21, and the second internal electrode layer 22 are determined as follows.

Figure 5:
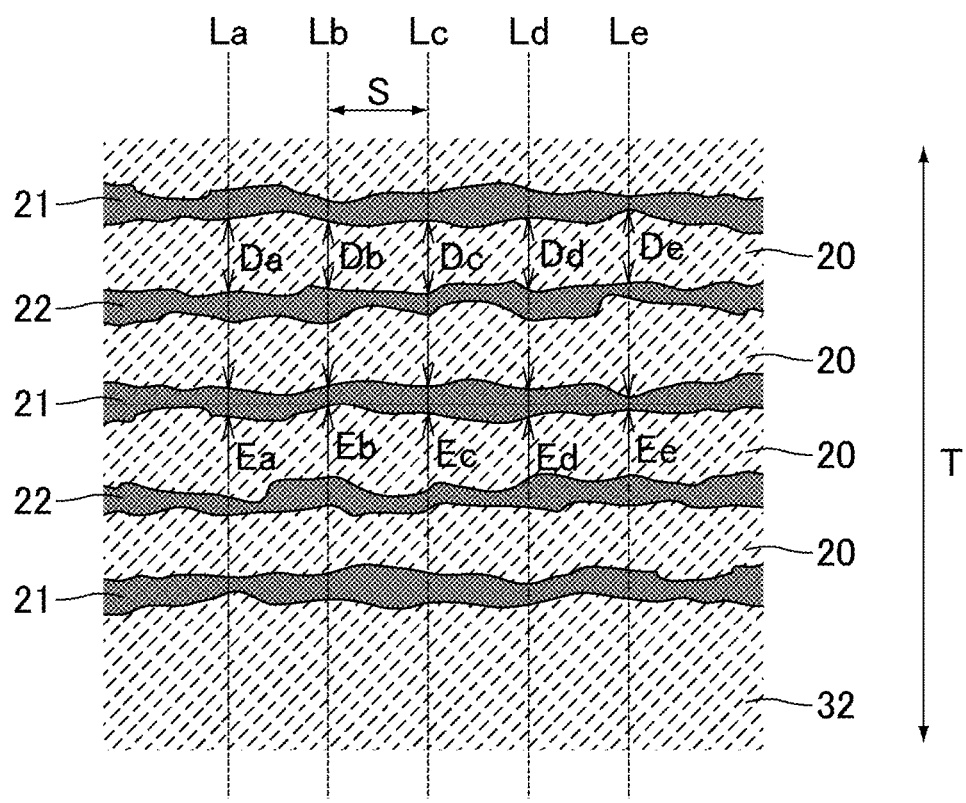
FIG. 5 is a schematic diagram showing a method of determining the thicknesses of a dielectric ceramic layer and an internal electrode layer.

FIG. 5 is a schematic diagram showing a method of determining the thicknesses of the dielectric ceramic layer and the internal electrode layer. FIG. 5 shows a portion of the WT cross-section at the central portion in the length (L) direction of the multilayer ceramic capacitor 1, in particular, a cross-section of the central layer portion 30 of the laminate 10, and corresponds to a portion of a cross-section indicating a portion corresponding to a line segment C-C in FIG. 3.

First, the WT cross-section at the central portion in the length (L) direction of the multilayer ceramic capacitor 1 is exposed by polishing. If necessary, an etching treatment is performed on a polished surface in order to adjust the cross-sectional shapes of the first internal electrode layers 21 and the second internal electrode layers 22 that have been stretched by polishing. The exposed WT cross-section is observed with a scanning electron microscope (SEM).

Next, a straight line Lc extending in the lamination (T) direction of the laminate 10 and passing through the center of the laminate 10 is drawn in an observed magnified image. Then, multiple straight lines parallel or substantially parallel to the straight line Lc are drawn at equal intervals at a pitch S. The pitch S may be determined to be about 5 or more and about 10 or less times as large as the thickness of a dielectric ceramic layer 20 or a first internal electrode layer 21 or a second internal electrode layer 22 to be measured. For example, when a dielectric ceramic layer 20 having a thickness of about 1 µm is to be measured, the pitch S is set to about 5 µm. Here, when multiple straight lines parallel or substantially parallel to the straight line Lc are drawn, the same number of straight lines are drawn on each of both sides of the straight line Lc. In other words, an odd number of straight lines including the straight line Lc are drawn. FIG. 5 shows five straight lines La, Lb, Lc, Ld, and Le.

The thicknesses of the dielectric ceramic layer 20, the first internal electrode layer 21, and the second internal electrode layer 22 on each straight line of the straight lines La, Lb, Lc, Ld, and Le are measured. However, when a first internal electrode layer 21 or a second internal electrode layer 22 is missing on each of the straight lines La, Lb, Lc, Ld, and Le and thus dielectric ceramic layers 20 sandwiching the missing internal electrode layer therebetween are connected to each other or when a magnified image at a measurement position is unclear, the thicknesses of the dielectric ceramic layer 20, the first internal electrode layer 21 and the second internal electrode layer 22 on another straight line which is drawn farther away from the straight line Lc are measured.

For example, when the thickness of the dielectric ceramic layer 20 is determined, as shown in FIG. 5, a thickness Da on the straight line La, a thickness Db on the straight line Lb, a thickness Dc on the straight line Lc, a thickness Dd on the straight line Ld and a thickness De on the straight line Le are measured, and the average value of these thicknesses is set as the thickness of the dielectric ceramic layer 20.

When the thickness of the first internal electrode layer 21 is determined, as shown in FIG. 5, a thickness Ea on the straight line La, a thickness Eb on the straight line Lb, a thickness Ec on the straight line Lc, a thickness Ed on the straight line Ld and a thickness Ee on the straight line Le are measured, and the average value of these thicknesses is set as the thickness of the first internal electrode layer 21. The same applies to a case where the thickness of the second internal electrode layer 22 is determined.

When the average thickness of multiple dielectric ceramic layers 20 is measured, the thickness is determined according to the foregoing method for each of dielectric ceramic layers 20 of five layers obtained by adding the dielectric ceramic layer 20 located substantially at the center in the lamination (T) direction with dielectric ceramic layers 20 of respective two layers located on both sides of the above-described dielectric ceramic layer 20, and the average value of these determined thicknesses is set as the average thickness of the multiple dielectric ceramic layers 20. Note that when the lamination number of the dielectric ceramic layers 20 is less than 5, the thicknesses of all of the dielectric ceramic layers 20 are determined according to the above-described method, and the average value of these determined thicknesses is set as the average thickness of the multiple dielectric ceramic layers 20. The same applies to a case where the average value of multiple first internal electrode layers 21 is calculated and a case where the average value of multiple second internal electrode layers 22 is calculated.

Each of the thicknesses (thicknesses in the lamination (T) direction) of the peripheral layer portion 31 and the peripheral layer portion 32 is preferably about 15 μm or more and about 40 μm or less, for example.

From the viewpoint of maintaining the shape and performance of the multilayer ceramic capacitor 1, the inner layer 41a is preferably thinner than the outer layer 41b. From the same viewpoint, the inner layer 42a is preferably thinner than the outer layer 42b.

Each of the thicknesses (the thicknesses in the width (W) direction) of the inner layer 41a and the inner layer 42a is preferably about 0.1 μm or more and about 20 μm or less, for example. The thicknesses of the inner layer 41a and the inner layer 42a are preferably equal or substantially equal to each other.

Each of the thicknesses (the thicknesses in the width (W) direction) of the outer layer 41b and the outer layer 42b is preferably about 5 μm or more and about 20 μm or less, for example. The thicknesses of the outer layer 41b and the outer layer 42b are preferably equal or substantially equal to each other.

However, it is preferable that the outer layer 41b is thicker than the inner layer 41a while the thicknesses of the inner layer 41a and the outer layer 41b satisfy the above-described range. Further, it is preferable that the outer layer 42b is thicker than the inner layer 42a while the thicknesses of the inner layer 42a and the outer layer 42b satisfy the above-described ranges.

Each of the thicknesses (the thicknesses in the width (W) direction) of the side margin 41 and the side margin 42 is preferably about 5 μm or more and about 40 μm or less, and more preferably about 5 μm or more and about 20 μm or less, for example. It is preferable that the thicknesses of the side margin 41 and the side margin 42 are equal or substantially equal to each other.

The thicknesses of the respective ceramic layers (for example, the inner layer 41a, the inner layer 42a, the outer layer 41b, and the outer layer 42b) defining the side margin 41 and the side margin 42 are determined as follows.

First, the WT cross-section at the central portion in the length (L) direction of the multilayer ceramic capacitor 1 is exposed by polishing. Then, end portions in the width (W) direction of the first internal electrode layers 21 and the second internal electrode layers 22 on the exposed WT cross section, and one of the side margin 41 and the side margin 42 which is closer to these end portions are imaged by using an optical microscope or an electron microscope so as to fall into the same field of view. Three places of an upper portion, a central portion and a lower portion in the lamination (T) direction are selected as places where imaging is performed. At the upper portion, the central portion and the lower portion which have been imaged, multiple line segments are drawn from the end portions in the width (W) direction of the first internal electrode layers 21 and the second internal electrode layers 22 to the lateral surface (an external end portion in the width (W) direction of imaged one of the side margin 41 and the side margin 42) of the laminate 10, and the length of each line segment corresponding to each ceramic layer is measured. Thereafter, an average value of the measured lengths of the line segments is calculated for each of the upper portion, the central portion, and the lower portion. Further, by averaging the respective average values, the thickness of each ceramic layer defining the imaged one of the side margin 41 and the side margin 42 is determined.

For example, the following dimensions are preferable dimensions of the multilayer ceramic capacitor 1.

Type 1
Dimension in the length (L) direction: about 0.32 mm or more and about 0.36 mm or less
Dimensions in the width (W) direction: about 0.25 mm or more and about 0.30 mm or less
Dimension in the lamination (T) direction: about 0.25 mm or more and about 0.30 mm or less
Thickness of dielectric ceramic layer 20: about 4.7 μm or more and about 5.7 μm or less
Thicknesses of first internal electrode layer 21 and second internal electrode layer 22: about 0.9 μm or more and about 1.1 μm or less Type 2
Dimension in the length (L) direction: about 0.1 mm or more and about 0.12 mm or less
Dimension in the width (W) direction: about 0.63 mm or more and about 0.68 mm or less
Dimension in the lamination (T) direction: about 0.62 mm or more and about 0.68 mm or less
Thickness of dielectric ceramic layer 20: about 1.1 μm or more and about 1.5 μm or less
Thicknesses of first internal electrode layer 21 and second internal electrode layer 22: about 0.63 μm or more and about 0.75 μm or less In both of the types described above, the withstand voltage is improved by increasing the thickness of the dielectric ceramic layer 20. Furthermore, an effective area in which capacitance is generated can be increased or maximized by reducing or minimizing the side margin 41 and the side margin 42. In the case of an L gap, a step occurs usually due to a difference in thickness between the dielectric ceramic layer 20 and each of the first internal electrode layer 21 and the second internal electrode layer 22, and when each layer is laminated, the first internal electrode layer 21 and the second internal electrode layer 22 are curved in the lamination (T) direction, and the electric field concentrates on a curved portion, which deteriorates reliability. On the other hand, in the present preferred embodiment, by forming the dielectric ceramic layer 20 so as to compensate for the difference in thickness between the dielectric ceramic layer 20 and each of the first internal electrode layer 21 and the second internal electrode layer 22, the first internal electrode layer 21 and the second internal electrode layer 22 can be reduced or prevented from being curved, so that reliability is improved.

Method of Manufacturing Multilayer Ceramic Capacitor

A non-limiting example of a method of manufacturing a multilayer ceramic capacitor according to the first preferred embodiment of the present invention preferably includes a step of preparing a green chip having a lamination structure including multiple raw dielectric ceramic layers and multiple pairs of a raw first internal electrode layer and a raw second internal electrode layer, the raw first internal electrode layers and the raw second internal electrode layers being exposed on a first lateral surface and a second lateral surface that oppose each other in a width direction perpendicular or substantially perpendicular to a lamination direction; a step of producing a raw laminate by forming raw side margin on the first lateral surface and the second lateral surface of the green chip; and a step of sintering the raw laminate, wherein in the step of producing the raw laminate, a raw inner layer is formed on the first lateral surface and the second lateral surface, and raw outer layer is formed on an outermost side, thereby forming the raw side margin.

A non-limiting example of the method of manufacturing the multilayer ceramic capacitor according to the first preferred embodiment of the present invention will be described hereunder.

First, a ceramic green sheet which will be a dielectric ceramic layer 20 is prepared. The ceramic green sheet may include a binder, a solvent, etc. in addition to a ceramic raw material including a dielectric ceramic material described above. The ceramic green sheet is formed, for example, on a carrier film by using a die coater, a gravure coater, a micro gravure coater, or the like.

Figure 6A:
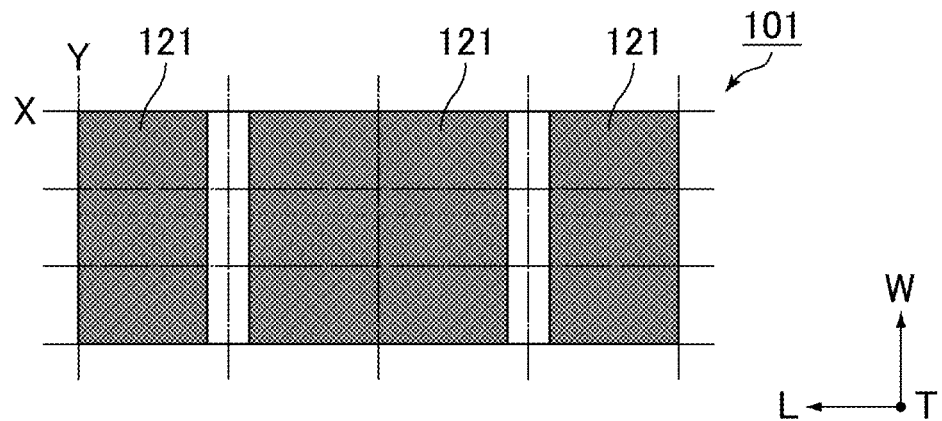
FIGS. 6A to 6C are schematic plan views showing examples of a ceramic green sheet.
Figure 6B:
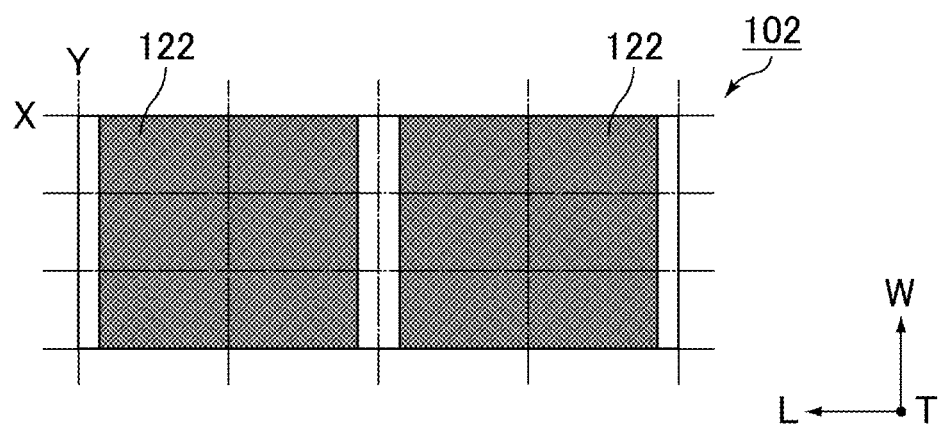
Figure 6C:
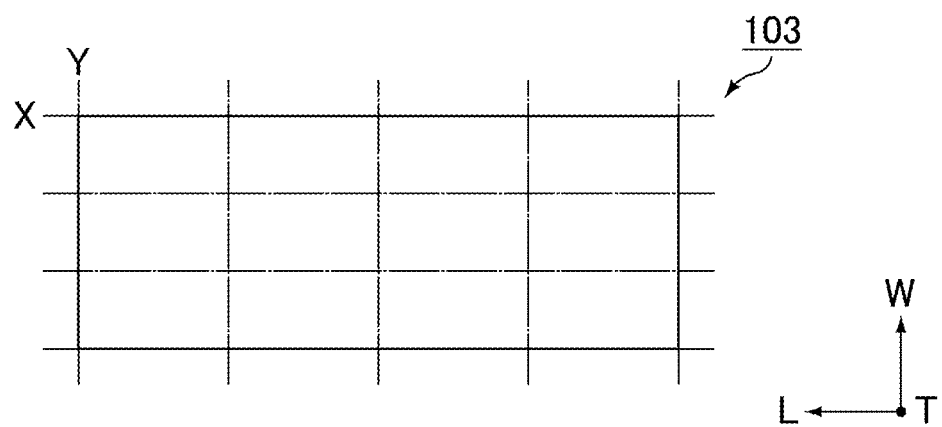

FIGS. 6A to 6C are schematic plan views showing examples of the ceramic green sheet. FIG. 6A shows a first ceramic green sheet 101 forming the central layer portion 30. FIG. 6B shows a second ceramic green sheet 102 forming the central layer portion 30. FIG. 6C shows a third ceramic green sheet 103 forming the peripheral layer portion 31 and the peripheral layer portion 32.

As shown in FIGS. 6A to 6C, the first ceramic green sheet 101, the second ceramic green sheet 102, and the third ceramic green sheet 103 are not cut and divided for each multilayer ceramic capacitor 1. FIGS. 6A to 6C show cutting lines X and cutting lines Y used in cutting and dividing the ceramic green sheets for each multilayer ceramic capacitor 1. The cutting lines X are parallel or substantially parallel to the length (L) direction, and the cutting lines Y are parallel or substantially parallel to the width (W) direction.

As shown in FIG. 6A, a raw first internal electrode layer 121 which will be a first internal electrode layer 21 is formed on the first ceramic green sheet 101. As shown in FIG. 6B, a raw second internal electrode layer 122 which will be a second internal electrode layer 22 is formed on the second ceramic green sheet 102. As shown in FIG. 6C, neither a raw first internal electrode layer 121 nor a raw second internal electrode layer 122 is formed on the third ceramic green sheet 103.

Each of the raw first internal electrode layer 121 and the raw second internal electrode layer 122 is formed, for example, by using any conductive paste for the internal electrode layer. When the raw first internal electrode layer 121 and the raw second internal electrode layer 122 are formed by using the conductive paste for the internal electrode layer, for example, a printing method such as a screen printing method or a gravure printing method is used.

Each of the raw first internal electrode layer 121 and the raw second internal electrode layer 122 is formed so as to extend in the length (L) direction over two adjacent regions partitioned by a cutting line Y and also extend in a belt shape in the width (W) direction. The raw first internal electrode layer 121 and the raw second internal electrode layer 122 are in such a positional relationship that the regions partitioned by the cutting lines Y are shifted column by column in the length (L) direction. In other words, the cutting line Y passing through the center of the raw first internal electrode layer 121 passes through a region between the raw second internal electrode layers 122 (where the raw second internal electrode layer 122 is not formed). In addition, the cutting line Y passing through the center of the raw second internal electrode layer 122 passes through a region between the raw first internal electrode layers 121 (where the first internal electrode layer 121 is not formed).

Next, the first ceramic green sheet 101 (with the raw first internal electrode layers 121), the second ceramic green sheet 102 (with the raw second internal electrode layers 122), and the third ceramic green sheet 103 are laminated to form a mother block.

Figure 7:
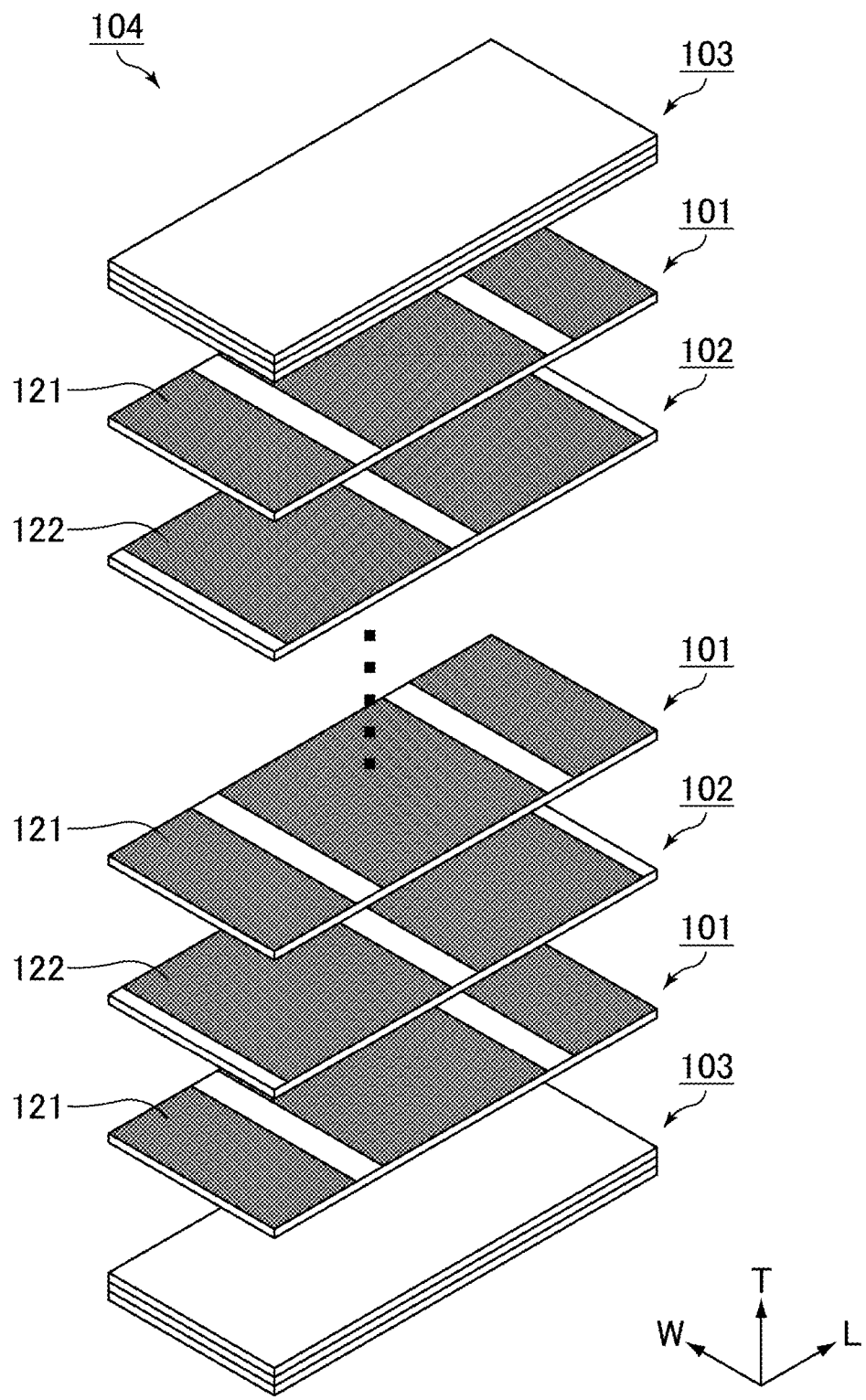
FIG. 7 is a schematic exploded perspective view showing an example of a mother block.

FIG. 7 is a schematic exploded perspective view showing an example of the mother block. In FIG. 7, the first ceramic green sheets 101, the second ceramic green sheets 102, and the third ceramic green sheets 103 are shown while exploded in the mother block 104. In the actual mother block 104, the first ceramic green sheets 101, the second ceramic green sheets 102, and the third ceramic green sheets 103 are pressed and integrated by a hydrostatic press or the like, for example.

In the mother block 104, the first ceramic green sheets 101 and the second ceramic green sheets 102 for forming the central layer portion 30 are alternately laminated in the lamination (T) direction. Furthermore, the third ceramic green sheets 103 for forming the peripheral layer portion 31 and the peripheral layer portion 32 are laminated on the upper surface and the lower surface in the lamination (T) direction of the laminate of the first ceramic green sheets 101 and the second ceramic green sheets 102, respectively. Note that in FIG. 7, for example, three third ceramic green sheets 103 are laminated on each of the upper surface and the lower surface, but the number of the third ceramic green sheets 103 may be changed as appropriate.

Next, multiple green chips are formed by cutting the mother block 104 along the cutting lines X and Y (see FIGS. 6A to 6C). When the mother block 104 is cut, for example, a cutting method such as dicing, force-cutting or laser cutting, for example, is used.

FIG. 8 is a schematic perspective view showing an example of the green chip. As shown in FIG. 8, a green chip 110 has a lamination structure including multiple raw dielectric ceramic layers 120, multiple raw first internal electrode layers 121, and multiple raw second internal electrode layers 122.

A first lateral surface 113 and a second lateral surface 114 of the green chip 110 are surfaces that appear when the mother block 104 is cut along the cutting line X. Both of the raw first internal electrode layer 121 and the raw second internal electrode layer 122 are exposed on each of the first lateral surface 113 and the second lateral surface 114.

A first end surface 115 and a second end surface 116 of the green chip 110 are surfaces that appear when the mother block 104 is cut along the cutting line Y. Only the raw first internal electrode layers 121 of the raw first internal electrode layers 121 and the raw second internal electrode layers 122 are exposed on the first end surface 115, and only the raw second internal electrode layers 122 is exposed on the second end surface 116.

Next, a raw laminate is produced by forming a raw side margin on each of the first lateral surface 113 and the second lateral surface 114 of the green chip 110. The raw side margins are formed, for example, by bonding side-margin ceramic green sheets to the first lateral surface 113 and the second lateral surface 114 of the green chip 110.

When the side margin is configured to have a two-layer structure including an inner layer and an outer layer, for example, the raw side margin is formed as follows.

First, a dielectric ceramic material is prepared which includes a perovskite compound including Ba and Ti (for example, BaTiO$_3$) as a main component and also includes at least one element selected from the group consisting of, for example, Si, Mg, Mn, Al, Zr, Ho, and Zn as an additive. Further, there is prepared ceramic slurry for the inner layer which includes a binder, a solvent, etc. in addition to a ceramic raw material including the above dielectric ceramic material. Here, the element of the additive of the dielectric ceramic material included in the ceramic slurry for the inner layer is made the same as the element of the additive of the dielectric ceramic material included in the third ceramic green sheet 103 for forming the peripheral layer portion 31 and the peripheral layer portion 32.

Next, a dielectric ceramic material is prepared which includes a perovskite compound including Ba and Ti (for example, BaTiO$_3$) as a main component and also includes at least one element selected from the group consisting of, for example, Si, Mg, Mn, Al, Zr, Ho, and Zn as an additive. Further, ceramic slurry is prepared for the outer layer which includes a binder, a solvent, etc. in addition to a ceramic raw material including the above dielectric ceramic material.

Next, the ceramic slurry for the outer layer is applied to a surface of a resin film and dried to produce an outer-layer ceramic green sheet. Then, the ceramic slurry for the inner layer is applied to a surface of the outer-layer ceramic green sheet which is opposite to the resin film, and dried to produce an inner-layer ceramic green sheet. Thereafter, the lamination sheet of the inner-layer ceramic green sheet and the outer-layer ceramic green sheet is separated from the resin film to obtain a side-margin ceramic green sheet having the two-layer structure.

Note that the side-margin ceramic green sheet having the two-layer structure can also be obtained, for example, by preparing the inner-layer ceramic green sheet and the outer-layer ceramic green sheet separately from each other in advance and then bonding them together. The side-margin ceramic green sheet may have a structure including three or more layers, instead of the two-layer structure described above.

Next, the first lateral surface 113 of the green chip 110 is pressed against the inner-layer ceramic green sheet side of the side-margin ceramic green sheet and punched out, such that the raw side margin is formed on the first lateral surface 113 of the green chip 110. Furthermore, the second lateral surface 114 of the green chip 110 is pressed against the inner-layer ceramic green sheet side of the side-margin ceramic green sheet and punched out, such that the raw side margin is formed on the second lateral surface 114 of the green chip 110. At this time, it is preferable that an organic solvent defining and functioning as an adhesive is applied in advance to each lateral surface of the first lateral surface 113 and the second lateral surface 114 of the green chip 110. The raw laminate has been obtained through the foregoing steps.

The raw side margin may be formed by another method as described below. When the side margin has a two-layer structure including an inner layer and an outer layer, first, the ceramic slurry for the inner layer is applied to each of the first lateral surface 113 and the second lateral surface 114 of the green chip 110 and dried, thus forming the raw inner layer. Then, the ceramic slurry for the outer layer is applied to a surface of the raw inner layer which is opposite to the green chip 110, and dried to form the raw outer layer. As a result, the raw side margin is formed.

The raw side margin may be formed by another method as described below. When the side margin has a two-layer structure including an inner layer and an outer layer, first, each end surface of the first end surface 115 and the second end surface 116 of the green chip 110 is covered (masked) with resin or the like. Then, the green chip 110 whose end surfaces have been covered with resin or the like is entirely immersed (dipped) in the ceramic slurry for the inner layer and dried to form the raw inner layer. Thereafter, the green chip 110 on which the raw inner layer has been formed is immersed (dipped) in the ceramic slurry for the outer layer as a whole, and dried to form the raw outer layer. In this case, the raw inner layer and the raw outer layer are also formed on the raw peripheral layer portion.

It is preferable that the raw laminate obtained by the above-described method is subjected to barrel polishing or the like. The corners and edges of the sintered laminate 10 are rounded by polishing the raw laminate.

Next, in the raw laminate, a conductive paste for the external electrodes preferably including, for example, Ni and a ceramic material is applied to each end surface of the first end surface 115 and the second end surface 116 of the green chip 110.

It is preferable that the conductive paste for the external electrodes includes, as a ceramic material, the same dielectric ceramic material as the outer-layer ceramic green sheet or the ceramic slurry for the outer layers. The content of the ceramic material in the conductive paste for the external electrodes is preferably about 15 wt % or more, for example. Furthermore, the content of the ceramic material in the conductive paste for external electrodes is preferably about 25 wt % or less, for example.

Next, the raw laminate to which the conductive paste for the external electrodes has been applied is subjected to, for example, a degreasing treatment under a predetermined condition in a nitrogen atmosphere, and then sintered at a predetermined temperature in a nitrogen-hydrogen-steam mixed atmosphere. As a result, the raw laminate and the conductive paste for the external electrodes are simultaneously sintered, and the laminate 10, the Ni layer to be connected to the first internal electrode layer 21, and the Ni layer to be connected to the second internal electrode layer 22 are simultaneously formed by a co-fire method. Each of the Ni layers is a cured product of the conductive paste for the external electrodes. Thereafter, for example, a first plating layer formed by Ni plating and a second plating layer formed by Sn plating are sequentially laminated on the surface of each of the Ni layers. As a result, the first external electrode 51 and the second external electrode 52 are formed.

Note that the laminate 10 and each of the first external electrode 51 and the second external electrode 52 may be formed at different times by a post-fire method. Specifically, first, the raw laminate is subjected to, for example, a degreasing treatment under a predetermined condition in a nitrogen atmosphere, and then sintered at a predetermined temperature in a nitrogen-hydrogen-steam mixed atmosphere to form the laminate 10. Thereafter, a conductive paste including, for example, Cu powder is applied to each end surface of the first end surface 15 and the second end surface 16 of the laminate 10, and then baked. As a result, the base electrode layer to be connected to the first internal electrode layer 21 and the base electrode layer to be connected to the second internal electrode layer 22 are formed. Thereafter, a conductive resin layer including conductive particles (for example, metal particles of, for example, Cu, Ag, Ni or the like) and resin, a first plating layer based on Ni plating, and a second plating layer based on Sn plating are sequentially laminated on the surface of each of the base electrode layers. As a result, the first external electrode 51 and the second external electrode 52 are formed.

The multilayer ceramic capacitor 1 has been manufactured through the above steps.

In the method of manufacturing the multilayer ceramic capacitor 1 described above, the mother block 104 is cut along the cutting lines X and the cutting lines Y to produce multiple green chips 110, and then the raw side margins are formed on both the lateral surfaces of the first lateral surface 113 and the second lateral surface 114 of the green chip 110, thereby producing the raw laminate. However, the process may be changed as follows.

First, multiple rod-shaped green blocks each including the raw first internal electrode layer 121 and the raw second internal electrode layer 122 exposed on both lateral surfaces which are cut surfaces are produced by cutting the mother block 104 along the cutting lines X. Thereafter, the raw side margins are formed on both lateral surfaces of the green block, and then the green block is cut along the cutting lines Y to produce multiple raw laminates. Thereafter, the multilayer ceramic capacitor 1 is manufactured according to the same manner as described above.

Second Preferred Embodiment

A multilayer ceramic capacitor according to a second preferred embodiment of the present invention will now be described. In the multilayer ceramic capacitor according to the first preferred embodiment of the present invention, "the element of the additive of the ceramic material included in the peripheral layer portion is the same as the element of the additive of the ceramic material included in the inner layer" is preferably included. However, in the multilayer ceramic capacitor according to the second preferred embodiment of the present invention, "the content of Si in the peripheral layer portion is equal or substantially equal to the content of Si in the inner layer" is preferably included. Except for this point, the multilayer ceramic capacitor according to the second preferred embodiment of the present invention is the same or substantially the same as the multilayer ceramic capacitor according to the first preferred embodiment of the present invention.

Multilayer Ceramic Capacitor

In the multilayer ceramic capacitor 1, the ceramic material included in the peripheral layer portion 31 and the peripheral layer portion 32 includes Si. Further, the ceramic material included in the side margin 41 and the side margin 42 includes Si. Si in the ceramic material improves reliability such as improved mechanical strength and reduction or prevention of water intrusion.

In the multilayer ceramic capacitor 1, the content of Si in one or both of the peripheral layer portion 31 and the peripheral layer portion 32 is preferably equal or substantially equal to the content of Si in one or both of the inner layer 41a and the inner layer 42a. As a result, the adhesive strength between the peripheral layer portion and the inner layer having the same Si content is improved, and as a result, peeling of the side margin including the inner layer is reduced or prevented.

"The content of Si in one or both of the peripheral layer portion 31 and the peripheral layer portion 32 is equal or substantially equal to the content of Si in one or both of the inner layer 41a and the inner layer 42a" includes, for example, the following Example 1B, Example 2B, and Example 3B, and is preferably Example 3B.

Example 1B

The content of Si in one or both of the peripheral layer portion 31 and the peripheral layer portion 32 is equal or substantially equal to the content of Si in the inner layer 41a. As a result, peeling of the side margin 41 is reduced or prevented.

Example 2B

The content of Si in one or both of the peripheral layer portion 31 and the peripheral layer portion 32 is equal or substantially equal to the content of Si in the inner layer 42a. As a result, peeling of the side margin 42 is reduced or prevented.

Example 3B

The content of Si in the peripheral layer portion 31 and the peripheral layer portion 32 is equal or substantially equal to the content of Si in the inner layer 41a and the inner layer 42a. As a result, peeling of both the side margin 41 and the side margin 42 is reduced or prevented.

Herein, "the contents of Si are equal or substantially equal to each other" means that the difference in the content of Si is within ±10%. For example, when comparing two layers, when the content of Si in one layer is P and the content of Si in the other layer is Q, a case satisfying $0.90 \leq P/Q \leq 1.10$ indicates that the contents of Si in both the layers are equal or substantially equal to each other. When comparing three or more layers, the difference between the maximum value and the minimum value of the Si content in these layers may preferably be within ±10%.

When the ceramic material included in the central layer portion 30 (that is, the dielectric ceramic material included in the dielectric ceramic layer 20) includes Si, focusing on the content of Si in the central layer portion 30 and the content of Si in the inner layer 41a and the inner layer 42a, the following are examples of preferable relationships.

When the content of Si in one or both of the peripheral layer portion 31 and the peripheral layer portion 32 is equal or substantially equal to the content of Si in the inner layer 41a, it is preferable that the content of Si in the central layer portion 30 and the content of Si in the inner layer 41a are equal or substantially equal to each other. As a result, the adhesive strength between the central layer portion 30 and the inner layer 41a is increased, so that peeling of the side margin 41 is further reduced or prevented.

When the content of Si in one or both of the peripheral layer portion 31 and the peripheral layer portion 32 is equal or substantially equal to the content of Si in the inner layer 42a, it is preferable that the content of Si in the central layer portion 30 and the content of Si in the inner layer 42a are equal or substantially equal to each other. As a result, the adhesive strength between the central layer portion 30 and the inner layer 42a is increased, so that peeling of the side margin 42 is further reduced or prevented.

When the content of Si in the peripheral layer portion 31 and the peripheral layer portion 32 is equal or substantially equal to the content of Si in the inner layer 41a and the inner layer 42a, it is preferable that the content of Si in the central layer portion 30 and the content of Si in the inner layer 41a and the inner layer 42a is equal or substantially equal to each other. As a result, the adhesive strength between the central layer portion 30 and each of the inner layer 41a and the inner layer 42a is increased, so that peeling of the side margin 41 and the side margin 42 is further reduced or prevented.

Focusing on the content of Si in the inner layer 41a and the inner layer 42a and the content of Si in the outer layer 41b and the outer layer 42b, the following are examples of preferable relationships.

When the content of Si in one or both of the peripheral layer portion 31 and the peripheral layer portion 32 is equal or substantially equal to the content of Si in the inner layer 41a, it is preferable that the content of Si in the outer layer 41b is larger than the content of Si in the inner layer 41a. As a result, even when the dimension in the width (W) direction of the side margin 41 is small, improvement in mechanical strength (improvement in reliability) of the side margin 41 by the outer layer 41b can be performed while peeling of the side margin 41 is reduced or prevented.

When the content of Si in one or both of the peripheral layer portion 31 and the peripheral layer portion 32 is equal or substantially equal to the content of Si in the inner layer 42a, it is preferable that the content of Si in the outer layer 42b is larger than the content of Si in the inner layer 42a. As a result, even when the dimension in the width (W) direction of the side margin 42 is small, improvement in mechanical strength (improvement in reliability) of the side margin 42 by the outer layer 42b can be performed while peeling of the side margin 42 is reduced or prevented.

When the content of Si in the peripheral layer portion 31 and the peripheral layer portion 32 is equal or substantially equal to the content of Si in the inner layer 41a and the inner layer 42a, it is preferable that the content of Si in the outer layer 41b and the outer layer 42b is larger than the content of Si in the inner layer 41a and the inner layer 42a. As a result, even when the dimensions in the width (W) direction of the side margin 41 and the side margin 42 are small, improvement in mechanical strength (improvement in reliability) of the side margin 41 and the side margin 42 by the outer layer 41b and the outer layer 42b can be performed while peeling of the side margin 41 and the side margin 42 is reduced or prevented.

Herein, "the content of Si is larger" means that the content of Si is larger in a state excluding a range meant by "the contents of Si are equal to each other" described above, that is, in a state excluding a range in which the difference in content of Si is within ±10%.

Focusing on the additive of the ceramic material included in the peripheral layer portion 31 and the peripheral layer portion 32 and the additive of the ceramic material included in the inner layer 41a and the inner layer 42a, the following are examples of preferable relationships.

When the content of Si in one or both of the peripheral layer portion 31 and the peripheral layer portion 32 is equal or substantially equal to the content of Si in the inner layer 41a, it is preferable that the element of the additive of the ceramic material included in one or both of the peripheral layer portion 31 and the peripheral layer portion 32 is the same as the element of the additive of the ceramic material included in the inner layer 41a. As a result, peeling of the side margin 41 is further reduced or prevented.

When the content of Si in one or both of the peripheral layer portion 31 and the peripheral layer portion 32 is equal or substantially equal to the content of Si in the inner layer 42a, it is preferable that the element of the additive of the ceramic material included in one or both of the peripheral layer portion 31 and the peripheral layer portion 32 is the same as the element of the additive of the ceramic material included in the inner layer 42a. As a result, peeling of the side margin 42 is further reduced or prevented.

When the content of Si in the peripheral layer portion 31 and the peripheral layer portion 32 is equal or substantially equal to the content of Si in the inner layer 41a and the inner layer 42a, it is preferable that the element of the additive of the ceramic material included in the peripheral layer portion 31 and the peripheral layer portion 32 is the same as the element of the additive of the ceramic material included in the inner layer 41a and the inner layer 42a. As a result, peeling of both the side margin 41 and the side margin 42 is further reduced or prevented.

Focusing on the additive of the ceramic material included in the inner layer 41a and the inner layer 42a and the additive of the ceramic material included in the outer layer 41b and the outer layer 42b, the following are examples of preferable relationships.

When the content of Si in one or both of the peripheral layer portion 31 and the peripheral layer portion 32 is equal or substantially equal to the content of Si in the inner layer 41a, it is preferable that the element of the additive of the ceramic material included in the inner layer 41a is different from the element of the additive of the ceramic material included in the outer layer 41b. As a result, it is possible to improve the mechanical strength (improve reliability) of the side margin 41 by the outer layer 41b while reducing or preventing peeling of the side margin 41.

When the content of Si in one or both of the peripheral layer portion 31 and the peripheral layer portion 32 is equal or substantially equal to the content of Si in the inner layer 42a, it is preferable that the element of the additive of the ceramic material included in the inner layer 42a is different from the element of the additive of the ceramic material included in the outer layer 42b. As a result, it is possible to improve the mechanical strength (improve reliability) of the side margin 42 by the outer layer 42b while reducing or preventing peeling of the side margin 42.

When the content of Si in the peripheral layer portion 31 and the peripheral layer portion 32 is equal or substantially equal to the content of Si in the inner layer 41a and the inner layer 42a, it is preferable that the element of the additive of the ceramic material included in the inner layer 41a and the inner layer 42a is different from the element of the additive of the ceramic material included in the outer layer 41b and the outer layer 42b. As a result, it is possible to improve the mechanical strength (improve reliability) of the side margin 41 and the side margin 42 by the outer layer 41b and the outer layer 42b while reducing or preventing peeling of the side margin 41 and the side margin 42.

Focusing on the main component of the ceramic material included in the peripheral layer portion 31 and the peripheral layer portion 32 and the main component of the ceramic material included in the inner layer 41a and the inner layer 42a, the following are examples of preferable relationships.

When the content of Si in one or both of the peripheral layer portion 31 and the peripheral layer portion 32 is equal or substantially equal to the content of Si in the inner layer 41a, it is preferable that the elements of the main components of the ceramic materials are also the same as each other. As a result, peeling of the side margin 41 is further reduced or prevented.

When the content of Si in one or both of the peripheral layer portion 31 and the peripheral layer portion 32 is equal or substantially equal to the content of Si in the inner layer 42a, it is preferable that the elements of the main components of the ceramic materials are also the same as each other. As a result, peeling of the side margin 42 is further reduced or prevented.

When the content of Si in the peripheral layer portion 31 and the peripheral layer portion 32 is equal or substantially equal to the content of Si in the inner layer 41a and the inner layer 42a, it is preferable that the elements of the main components of the ceramic materials are also the same as each other. As a result, peeling of both the side margin 41 and the side margin 42 is further reduced or prevented.

Focusing on the main component of the ceramic material included in the central layer portion 30 and the main component of the ceramic material included in the inner layer 41a and the inner layer 42a, the following are examples of preferable relationships.

When the content of Si in one or both of the peripheral layer portion 31 and the peripheral layer portion 32 is equal or substantially equal to the content of Si in the inner layer 41a, it is preferable that the element of the main component of the ceramic material included in the central layer portion 30 (that is, the dielectric ceramic material included in the dielectric ceramic layer 20) is the same as the element of the main component of the ceramic material included in the inner layer 41a. As a result, the adhesive strength between the central layer portion 30 and the inner layer 41a is increased, so that peeling of the side margin 41 is further reduced or prevented.

When the content of Si in one or both of the peripheral layer portion 31 and the peripheral layer portion 32 is equal or substantially equal to the content of Si in the inner layer 42a, it is preferable that the element of the main component of the ceramic material included in the central layer portion 30 (that is, the dielectric ceramic material included in the dielectric ceramic layer 20) is the same as the element of the main component of the ceramic material included in the inner layer 42a. As a result, the adhesive strength between the central layer portion 30 and the inner layer 42a is increased, so that peeling of the side margin 42 is further reduced or prevented.

When the content of Si in the peripheral layer portion 31 and the peripheral layer portion 32 is equal or substantially equal to the content of Si in the inner layer 41a and the inner layer 42a, it is preferable that the element of the main component of the ceramic material included in the central layer portion 30 (that is, the dielectric ceramic material included in the dielectric ceramic layer 20) is the same as the element of the main component of the ceramic material included in the inner layer 41a and the inner layer 42a. As a result, the adhesive strength between the central layer portion 30 and each of the inner layer 41a and the inner layer 42a is increased, so that peeling of the side margin 41 and the side margin 42 is further reduced or prevented.

The contents of Si in each layer and each portion can be checked by performing quantitative analysis using the inductively coupled plasma (ICP) emission spectroscopy.

Method of Manufacturing Multilayer Ceramic Capacitor

A non-limiting example of a method of manufacturing the multilayer ceramic capacitor according to the second preferred embodiment of the present invention is the same or substantially the same as the example of the method of manufacturing the multilayer ceramic capacitor according to the first preferred embodiment of the present invention described above except that "the content of Si in the peripheral layer portion is equal to the content of Si in the inner layer". For example, an additive including Si is added to the dielectric ceramic material included in the third ceramic green sheet 103 for forming the peripheral layer portions 31 and 32, and an additive including Si is added to the dielectric ceramic material included in the ceramic slurry for the inner layers with the Si contents of both the additives being equal to each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate including a dielectric ceramic layer and an internal electrode layer that are laminated in a lamination direction; and
an external electrode connected to the internal electrode layer; wherein
the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layer includes a first internal electrode layer extending to the first end surface and a second internal electrode layer extending to the second end surface so as to oppose the first internal electrode layer with the dielectric ceramic layer therebetween;
the external electrode includes a first external electrode disposed on the first end surface and connected to the first internal electrode layer, and a second external electrode disposed on the second end surface and connected to the second internal electrode layer;
the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material;
the side margin includes an inner layer on an innermost side in the width direction and an outer layer on an outermost side in the width direction;
an element of an additive of the ceramic material included in the peripheral layer portion is the same as an element of an additive of a ceramic material included in the inner layer; and
the element of the additive of the ceramic material included in the inner layer is different from an element of an additive of a ceramic material included in the outer layer.

2. The multilayer ceramic capacitor according to claim 1, wherein an element of a main component of the ceramic material included in the peripheral layer portion is the same as an element of a main component of a ceramic material included in the inner layer.

3. The multilayer ceramic capacitor according to claim 2, wherein an element of a main component of a ceramic material included in the central layer portion is the same as the element of the main component of the ceramic material included in the inner layer.

4. The multilayer ceramic capacitor according to claim 1, wherein a thickness of each of the first internal electrode layer and the second internal electrode layer is about 0.4 μm or less.

5. The multilayer ceramic capacitor according to claim 4, wherein the thickness of each of the first internal electrode layer and the second internal electrode layer is about 0.38 μm or less.

6. The multilayer ceramic capacitor according to claim 1, wherein a thickness of the dielectric ceramic layer is about 0.55 μm or less.

7. The multilayer ceramic capacitor according to claim 1, wherein
each of the first external electrode and the second external electrode includes a Ni layer including Ni and a ceramic material; and
the ceramic material is present in the Ni layer in an amount of about 25 area % or more and about 40 area % or less.

8. A multilayer ceramic capacitor comprising:
a laminate including a dielectric ceramic layer and an internal electrode layer that are laminated in a lamination direction; and
an external electrode connected to the internal electrode layer; wherein
the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layer includes a first internal electrode layer extending to the first end surface and a second internal electrode layer extending to the second end surface so as to oppose the first internal electrode layer with the dielectric ceramic layer therebetween;
the external electrode includes a first external electrode disposed on the first end surface and connected to the first internal electrode layer, and a second external electrode disposed on the second end surface and connected to the second internal electrode layer;
the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material;
the side margin includes an inner layer on an innermost side in the width direction and an outer layer on an outermost side in the width direction;
a content of Si in the peripheral layer portion is equal or substantially equal to a content of Si in the inner layer;
an element of an additive of the ceramic material included in the peripheral layer portion is the same as an element of an additive of a ceramic material included in the inner layer; and
the element of the additive of the ceramic material included in the inner layer is different from an element of an additive of a ceramic material included in the outer layer.

9. The multilayer ceramic capacitor according to claim 8, wherein a content of Si in the central layer portion is equal or substantially equal to a content of Si in the inner layer.

10. The multilayer ceramic capacitor according to claim 8, wherein a content of Si in the outer layer is larger than a content of Si in the inner layer.

11. The multilayer ceramic capacitor according to claim 8, wherein an element of a main component of the ceramic material included in the peripheral layer portion is the same as an element of a main component of a ceramic material included in the inner layer.

12. The multilayer ceramic capacitor according to claim 11, wherein an element of a main component of a ceramic material included in the central layer portion is the same as the element of the main component of the ceramic material included in the inner layer.

13. The multilayer ceramic capacitor according to claim 8, wherein a thickness of each of the first internal electrode layer and the second internal electrode layer is about 0.4 μm or less.

14. The multilayer ceramic capacitor according to claim 13, wherein the thickness of each of the first internal electrode layer and the second internal electrode layer is about 0.38 μm or less.

15. The multilayer ceramic capacitor according to claim 8, wherein a thickness of the dielectric ceramic layer is about 0.55 μm or less.

16. The multilayer ceramic capacitor according to claim 8, wherein
each of the first external electrode and the second external electrode includes a Ni layer including Ni and a ceramic material; and
the ceramic material is present in the Ni layer in an amount of about 25 area % or more and about 40 area % or less.

17. A multilayer ceramic capacitor comprising:
a laminate including a dielectric ceramic layer and an internal electrode layer that are laminated in a lamination direction; and
an external electrode connected to the internal electrode layer; wherein
the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layer includes a first internal electrode layer extending to the first end surface and a second internal electrode layer extending to the second end surface so as to oppose the first internal electrode layer with the dielectric ceramic layer therebetween;
the external electrode includes a first external electrode disposed on the first end surface and connected to the first internal electrode layer, and a second external electrode disposed on the second end surface and connected to the second internal electrode layer;
the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material;

the side margin includes an inner layer on an innermost side in the width direction and an outer layer on an outermost side in the width direction;

a content of Si in the peripheral layer portion is equal or substantially equal to a content of Si in the inner layer; and a content of Si in the central layer portion is equal or substantially equal to the content of Si in the inner layer.

* * * * *